United States Patent
Zhang et al.

(10) Patent No.: US 10,262,092 B1
(45) Date of Patent: Apr. 16, 2019

(54) INTERACTIVE PLATFORM TO PREDICT MISMATCH VARIATION AND CONTRIBUTION WHEN ADJUSTING COMPONENT PARAMETERS

(71) Applicant: Cadence Design Systems, Inc., San Jose, CA (US)

(72) Inventors: Wangyang Zhang, Allison Park, PA (US); Hongzhou Liu, Sewickley, PA (US); Catherine Bunting, Phoenix, AZ (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 50 days.

(21) Appl. No.: 15/589,762

(22) Filed: May 8, 2017

(51) Int. Cl.
G06F 17/50 (2006.01)

(52) U.S. Cl.
CPC ...... *G06F 17/5036* (2013.01); *G06F 17/5045* (2013.01); *G06F 2217/10* (2013.01); *G06F 2217/12* (2013.01)

(58) Field of Classification Search
CPC ............. G06F 17/5036; G06F 17/5045; G06F 2217/10; G06F 2217/12
See application file for complete search history.

(56) References Cited

U.S. PATENT DOCUMENTS

| | | | | |
|---|---|---|---|---|
| 6,560,755 B1 * | 5/2003 | Zhang | ................. | G06F 17/5036 716/111 |
| 6,721,940 B2 * | 4/2004 | Miwa | ..................... | G03F 7/705 700/121 |
| 6,823,497 B2 * | 11/2004 | Schubert | ............. | G06F 17/5022 716/106 |
| 7,171,346 B1 * | 1/2007 | Recker | ................ | G06F 17/5036 703/13 |
| 7,239,991 B2 * | 7/2007 | Tuszynski | .............. | G05B 17/02 700/13 |
| 7,493,574 B2 * | 2/2009 | Liu | ...................... | G06F 17/5036 716/132 |
| 7,742,044 B2 * | 6/2010 | Yu | ........................ | G09G 3/3685 345/204 |

(Continued)

OTHER PUBLICATIONS

Kinget, Peter R., "Device Mismatch and Tradeoffs in the Design of Analog Circuits", IEEE Journal of Solid-State Circuits, vol. 40, No. 6, Jun. 2005, pp. 1212-1224.

(Continued)

*Primary Examiner* — Helen Rossoshek
(74) *Attorney, Agent, or Firm* — McDermott Will & Emery LLP

(57) ABSTRACT

A method for determining mismatch variation of circuit components in a circuit is provided. The method includes determining a mismatch contribution for a specification of an integrated circuit design and displaying a list of components in the circuit design sorted according to the mismatch contribution. The method also includes displaying an adjustable scale for a size of the component, modifying the circuit design according to with the size of the component adjusted according to a user input to the adjustable scale, determining an adjusted mismatch contribution of the component, and displaying in the list of components a modified value of the mismatch contribution, and a modified value of an overall standard deviation for the specification in the circuit design.

20 Claims, 6 Drawing Sheets

(56) References Cited

U.S. PATENT DOCUMENTS

| | | | | |
|---|---|---|---|---|
| 8,176,463 | B2* | 5/2012 | O'Riordan | G06F 17/504 |
| | | | | 703/14 |
| 8,271,256 | B2* | 9/2012 | Khalily | G06F 17/5036 |
| | | | | 703/14 |
| 8,305,106 | B2* | 11/2012 | Bohn | H04B 17/0085 |
| | | | | 324/750.3 |
| 8,479,126 | B1* | 7/2013 | Liu | G06F 17/5036 |
| | | | | 703/14 |
| 8,539,427 | B2* | 9/2013 | Lu | G06F 17/5036 |
| | | | | 716/136 |
| 8,639,112 | B2* | 1/2014 | Lindsay | H04B 10/0799 |
| | | | | 398/16 |
| 8,954,908 | B1* | 2/2015 | Liu | G06F 17/5036 |
| | | | | 703/14 |
| 8,954,910 | B1 | 2/2015 | Liu et al. | |
| 9,235,675 | B2* | 1/2016 | Chan | G06F 17/5081 |
| 9,519,304 | B1* | 12/2016 | Far | G05F 3/262 |
| 2004/0174759 | A1* | 9/2004 | Bhat | G11C 7/06 |
| | | | | 365/205 |
| 2005/0055110 | A1* | 3/2005 | Tuszynski | G05B 17/02 |
| | | | | 700/31 |
| 2010/0185431 | A1* | 7/2010 | Kokuda | G06F 17/5045 |
| | | | | 703/14 |
| 2014/0236516 | A1* | 8/2014 | Pforr | G03F 1/84 |
| | | | | 702/84 |
| 2014/0354350 | A1* | 12/2014 | Bowers | H03F 3/195 |
| | | | | 327/564 |
| 2015/0249449 | A1* | 9/2015 | Cai | H03K 17/063 |
| | | | | 327/436 |
| 2016/0147923 | A1* | 5/2016 | Lu | G06F 17/5036 |
| | | | | 703/14 |
| 2018/0173834 | A1 | 6/2018 | Chollangi et al. | |

OTHER PUBLICATIONS

Pelgrom, Marcel J. M. et al., "Transistor matching in analog CMOS applications", International Electron Devices Meeting 1998, Technical Digest (Cat. No. 98CH36217), pp. 915-918.

Peter R. Kinger, "Device Mismatch and Tradeoffs in the Design of Analog Circuits", IEEE Journal of Solid-State Circuits, Jun. 2005, vol. 40, No. 6, pp. 1212-1223.

Marcel J.M. Pelgrom, Hans P. Tuinhout, and Maarton Vertregt, "Transistor matching in analog CMOS applications", 1998 IEEE, IEDM 98-915 through IEDM 98-918, pp. 34.1.2-34.1.4, Philips Research Laboratories, Bldg. Ways, prof. Holstlaan 4, 5656AA Eindhoven, the Netherlands.

* cited by examiner

| ▼ | Top | Max | PhaseMargin Nominal Yield = 100.00% R^2 = 0.99998 | | Gain Nominal Yield = 100.00% R^2 = 0.99943 | | BW 3dB Nominal Yield = 100.00% R^2 = 0.99699 | | Current Nominal Yield = 100.00% R^2 = 0.99999 | |
|---|---|---|---|---|---|---|---|---|---|---|
| Top | 100% | 100% | 100% | | 100% | | 100% | | 100% | |
| /IO/M6 | 73% | 210-6 | 6% | 221-6 | 37% | 222-6 | 3% | 223-6 | 73% | 224-6 |
| /IO/M7 | 44% | 210-7 | 44% | 221-7 | 4% | 222-7 | 9% | 223-7 | 2% | 224-7 |
| /IO/M8 | 38% | 210-8 | 38% | 221-8 | 19% | 222-8 | 9% | 223-8 | 9% | 224-8 |
| /IO/M2 | 37% | 210-2 | 1% | 221-2 | 12% | 222-2 | 37% | 223-2 | 1% | 224-2 |
| /IO/M1 | 20% | 210-1 | 1% | 221-1 | 8% | 222-1 | 20% | 223-1 | 0% | 224-1 |
| /IO/M4 | 10% | 210-4 | 1% | 221-4 | 4% | 222-4 | 10% | 223-4 | 0% | 224-4 |
| /IO/M10 | 8% | 210-10 | 0% | 221-10 | 4% | 222-10 | 1% | 223-10 | 8% | 224-10 |
| /IO/M9 | 8% | 210-9 | 0% | 221-9 | 4% | 222-9 | 1% | 223-9 | 8% | 224-9 |
| /IO/M5 | 7% | 210-5 | 3% | 221-5 | 7% | 222-5 | 5% | 223-5 | 0% | 224-5 |
| /IO/COq | 4% | 210-c | 4% | 221-c | 0% | 222-c | 1% | 223-c | 0% | 224-c |
| /IO/M3 | 4% | 210-3 | 0% | 221-3 | 2% | 222-3 | 4% | 223-3 | 0% | 224-3 |

FIG. 2

| 200 ⟶ | | PhaseMargin Nominal Yield = 100.00% R^2 = 0.99998 | Gain Nominal Yield = 100.00% R^2 = 0.99943 | BW3dB Nominal Yield = 100.00% R^2 = 0.99699 | Current Nominal Yield = 100.00% R^2 = 0.99999 | Feature Size Factor 350 |
|---|---|---|---|---|---|---|
| Std Dev | ▼ ┌─ Max ─┐ | 7.4e-02 (+3.28%) | 3.3e-02 (-15.57%) | 3.5e+04 (-0.19%) | 7.0e-06 (-26.81%) | |
| /IO/M6 | 54% 310-6 | 2% 321-6 | 21% 322-6 | 1% 323-6 | 54% 324-6 | 2.50x ──□ 360-6 |
| /IO/M7 | 69% 310-7 | 69% 321-7 | 8% 322-7 | 16% 323-7 | 7% 324-7 | 0.50x □── 360-7 |
| /IO/M8 | 18% 210-8 | 18% 321-8 | 13% 322-8 | 5% 323-8 | 8% 324-8 | 2.00x ─□ 360-8 |
| /IO/M2 | 37% 210-2 | 1% 221-2 | 17% 222-2 | 37% 223-2 | 1% 224-2 | 1.00x □ 360-2 |
| /IO/M1 | 20% 210-1 | 1% 221-1 | 11% 222-1 | 20% 223-1 | 0% 224-1 | 1.00x □ 360-1 |
| /IO/M4 | 10% 210-4 | 1% 221-4 | 6% 222-4 | 10% 223-4 | 0% 224-4 | 1.00x □ 360-4 |
| /IO/M10 | 14% 210-10 | 0% 221-10 | 5% 222-10 | 1% 223-10 | 14% 224-10 | 1.00x □ 360-10 |
| /IO/M9 | 14% 210-9 | 0% 221-9 | 6% 222-9 | 1% 223-9 | 14% 224-9 | 1.00x □ 360-9 |
| /IO/M5 | 9% 210-5 | 3% 221-5 | 9% 222-5 | 5% 223-5 | 0% 224-5 | 1.00x □ 360-5 |
| /IO/Coq | 4% 210-c | 4% 221-c | 0% 222-c | 1% 223-c | 0% 224-c | 1.00x □ 360-C |
| /IO/M3 | 4% 210-3 | 0% 221-3 | 3% 222-3 | 4% 223-3 | 0% 224-3 | 1.00x □ 360-3 |

FIG. 3

INTERACTIVE PLATFORM TO PREDICT MISMATCH VARIATION AND CONTRIBUTION WHEN ADJUSTING COMPONENT PARAMETERS

TECHNICAL FIELD

Embodiments described herein are generally related to the field of circuit simulation in circuit designing and fabrication. More specifically, embodiments described herein are related to predicting mismatch variation for individual components in an integrated circuit (IC) design.

BACKGROUND

In integrated circuit (IC) design, the contribution to the variance in a circuit specification may vary largely between the different components in the IC design (e.g., "mismatch variation"). Accordingly, certain components may have a large contribution to overall performance variance. Typical remedies to correct for a component mismatch variation include increasing the overall size of the component (e.g., area, width, length, and the like). However, precisely establishing which of the circuit components has a large mismatch variation contribution includes performing costly circuit simulations, e.g., Monte Carlo (MC) simulations, involving the use of intensive computation resources and time. Moreover, increasing a component size without a precise knowledge of which components contribute most, and by how much, to performance variance, may undesirably and unnecessarily increase overall IC design size. In addition, it is desirable to determine how much mismatch variance reduction is obtained for a given size increase in a component, so that a minimal size increase is applied and only to the critical components. Typically, this determination involves a new set of circuit simulations, thus exacerbating design costs, as noted above.

The description provided in the background section should not be assumed prior art merely because it is mentioned in or associated with the background section. The background section may include information that describes one or more aspects of the subject technology.

SUMMARY

In a first embodiment, a computer-implemented method for determining mismatch variation of circuit components in an integrated circuit design is disclosed that includes determining a first mismatch contribution of a component for a first specification of an integrated circuit design, the integrated circuit design including multiple components. The computer-implemented method also includes displaying the component in a list of the multiple components sorted according to the first mismatch contribution and displaying an adjustable scale for a size of the component. The computer-implemented method also includes modifying the integrated circuit design with the size of the component adjusted according to a user input to the adjustable scale, determining an adjusted mismatch contribution of the component, and displaying in the list of the multiple components a modified value of the first mismatch contribution, and a modified value of an overall standard deviation for the first specification in the integrated circuit design.

In a second embodiment, a system is disclosed that includes a memory storing instructions, and at least one processor that executes the instructions to determine a first mismatch contribution of a component for a first specification of an integrated circuit design, the integrated circuit design including multiple components. The at least one processor further executes instructions to display the component in a list of the multiple components sorted according to the first mismatch contribution of the component, and to display an adjustable scale for a size of the component. The at least one processor further executes instructions to modify the integrated circuit design with the size of the component adjusted according to a user input to the adjustable scale, determine an adjusted mismatch contribution of the component, and display in the list of the multiple components a modified value of the first mismatch contribution, and a modified value of an overall standard deviation for the first specification in the integrated circuit design.

In yet another embodiment, a non-transitory, machine-readable storage medium is disclosed that includes machine-readable instructions for causing a processor to execute a method for determining mismatch variation of circuit components in an integrated circuit design is disclosed that includes determining a first mismatch contribution of a component for a first specification of an integrated circuit design, the integrated circuit design including multiple components. The method also includes displaying the component in a list of the multiple components sorted according to the first mismatch contribution and displaying an adjustable scale for a size of the component. The method also includes modifying the integrated circuit design with the size of the component adjusted according to a user input to the adjustable scale, determining an adjusted mismatch contribution of the component, and displaying in the list of the multiple components a modified value of the first mismatch contribution, and a modified value of an overall standard deviation for the first specification in the integrated circuit design.

In a further embodiment, a system is disclosed that includes a means for storing computer code and a means to execute the computer code to perform steps to determine a first mismatch contribution of a component for a first specification of an integrated circuit design, the integrated circuit design including multiple components. The means to execute the computer code further executes instructions to display a component in a list of the multiple components sorted according to the first mismatch contribution, and to display an adjustable scale for a size of the component. The means to execute the computer code further executes instructions to modify the integrated circuit design with the size of the component according to a user input to the adjustable scale, determine an adjusted mismatch contribution of the component, and display in the list of the multiple components a modified value of the first mismatch contribution, and a modified value of an overall standard deviation for the first specification in the integrated circuit design.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings:

FIG. 2 illustrates a display of a list of components in an IC design sorted according to a mismatch contribution of each component for different performance parameters in the IC design, according to some embodiments.

FIG. 3 illustrates a display of the list of components in the IC design, and a list of adjustable scales for component features for each of the components in the list of components, according to some embodiments.

Figure 1:
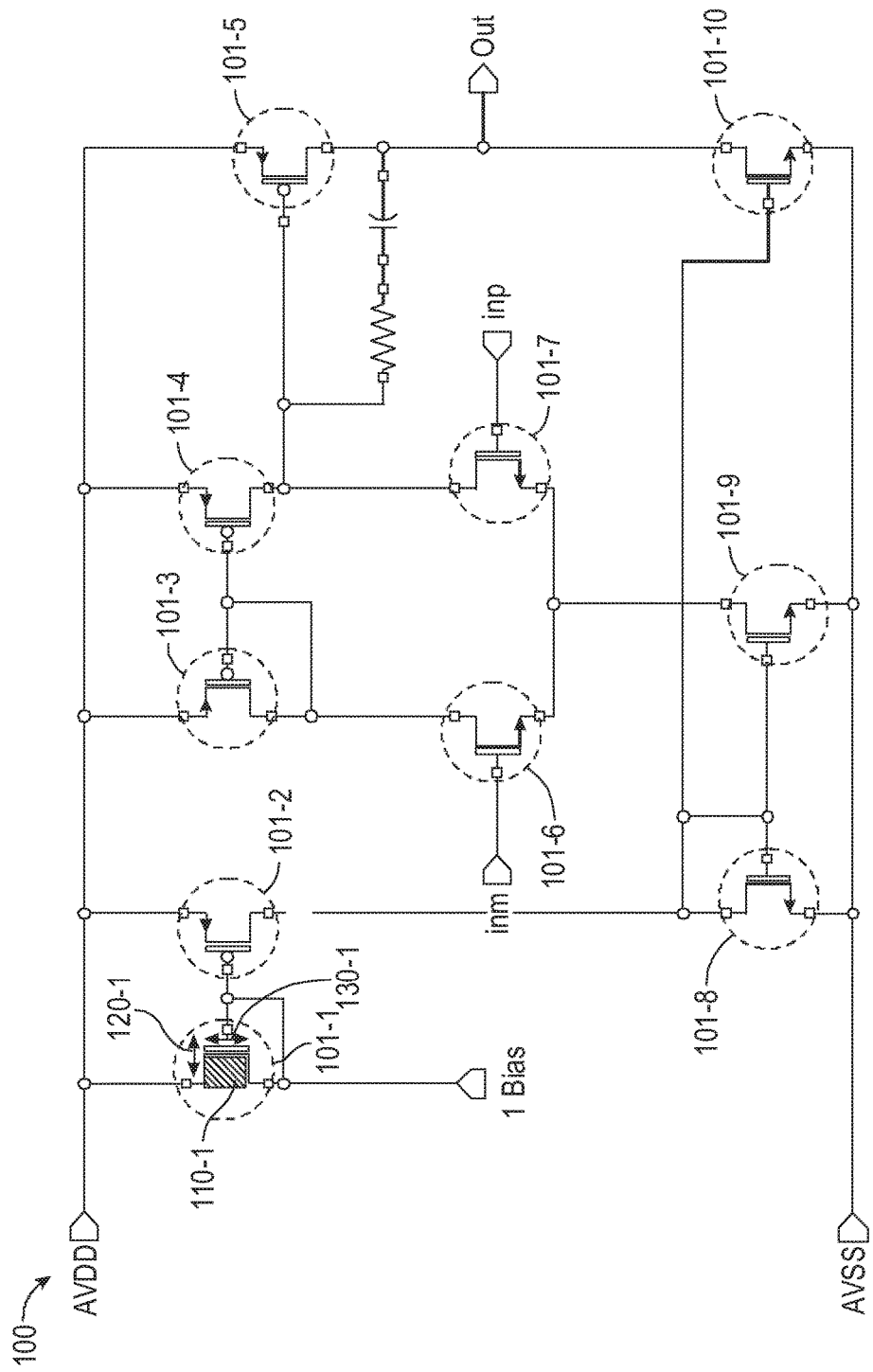
FIG. 1 illustrates a layout of an IC design according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a method for efficiently predicting mismatch variation and contribution for a circuit component when a physical parameter (e.g., size, area, and the like) of the circuit is updated during circuit design. The mismatch variation is associated with a desired value for a circuit specification (e.g., phase margin, nominal gain, bandwidth, nominal current, leakage current, power consumption, and the like).

The disclosed system addresses a technical problem tied to computer technology and arising in the realm of computer networks, namely the technical problem of reducing performance variability in a circuit design with an efficient usage of computer processing resources. The disclosed system solves this problem by generating a multi-dimensional model of the circuit specification in terms of random variables that scale accordingly with component size. In addition, some embodiments include a mixed solver when a multi-dimensional model is not available, or to increase the estimation accuracy of the multi-dimensional model. The mixed solver may include a scaling model for the variation in mismatch contribution from a given random variable based on the variation of the physical property of a component.

Embodiments consistent with the present disclosure may be used by circuit designers to decide which component to resize in a circuit design and by how much to reduce the performance variability and ultimately improve the overall performance of the circuit design. Some embodiments provide a mismatch tuner to update the mismatch contribution and the standard deviation of the circuit specification, in real-time. The mismatch tuner may include a number of sliders, each of which is associated with a physical parameter of a component in a mismatch contribution table (e.g., component size, area, and the like). The user may adjust the physical parameter of a selected component by moving the associated slider accordingly, and the mismatch tuner provides, in real-time, or almost in real-time, an updated value of the mismatch contribution for the selected component.

In some embodiments, the multi-dimensional model involves analytical calculations performed almost instantly by a processor, with no additional circuit simulation. In some embodiments, the prediction of mismatch contribution obtained with the multi-dimensional model is sufficiently accurate for a circuit user to proceed with a full circuit design before performing a thorough circuit simulation (e.g., through a MC simulation).

At advanced nodes (e.g., component features of 10's of nm or less), mismatch variation plays an important role in circuit design. Generally, the mismatch variation for a single circuit component is reduced when a size feature (e.g., area, length, width, and the like) for the circuit component is increased. However, in many applications it is desirable to enlarge circuit components sparingly, as the circuit design benefits from a smaller footprint. Therefore, it is desirable to find the components that more significantly affect the overall variation in circuit specification, and target these components for adjustment of size features accordingly.

Some embodiments include a tool for estimating mismatch contribution starting with a selected, albeit reduced, number of MC samples to estimate the contribution of each component in a circuit design to the overall variation of a circuit specification. The tool further provides a list of each of the components in the circuit design. Further, the list may be sorted according to the contribution to performance variability from each device, and for one or more circuit specification values (e.g., phase margin, nominal gain, bandwidth, nominal current, leakage current, power consumption, and the like). Accordingly, a user may select the components associated with the largest mismatch variation contribution. The tool further provides the ability for a user to increase a size feature of a selected component to reduce a mismatch variation contribution for that component. In embodiments as disclosed herein, this process is straightforward, reducing trial-and-error steps even for inexperienced users. The tool provides an interactive flow to predict the mismatch variation and contribution when the user adjusts a feature size of the component.

In some aspects, a tool, as disclosed herein, includes a multi-dimensional model to adjust a mismatch contribution for a circuit component when a user adjusts a size feature of the circuit component. The tool may also include a model to predict the new standard deviation for the overall circuit specification when the user adjusts the size feature of the circuit component. In some embodiments, an interactive flow closely follows the mismatch contribution for each circuit component. Accordingly, the user may tweak a size feature of the circuit component using sliders or other user-friendly display features. Thus, an adjusted mismatch contribution for the component and overall standard deviation are updated in real-time, or almost in real-time.

FIG. 1 illustrates a layout of an IC design according to some embodiments. IC design 100 may include a netlist having a plurality of circuit components 101. Without limitation, IC design 100 may include an operational amplifier including metal-oxide-semiconductor field effect transistor (MOSFET) as circuit components 101-1 through 101-10 (hereinafter, collectively referred to as "components 101"). In general, components 101 may include N-type MOS (NMOS) transistors, P-type MOS transistors (PMOS), resistors, capacitors, inductors, and the like. Some of the circuit specifications that may be relevant for IC design 100 may include, without limitation, an operational current, a unit gain frequency (UGF), a gain value (which may be a function of frequency and/or load), and a random offset (e.g., voltage turn-on). Accordingly, a user may be interested in modeling IC design 100 according to the highest current that the design may draw, the lowest UGF that it may provide, lowest gain, and the largest random offset that may result under a wide range of operational configurations.

For each component 101, the foundry may provide a set of random variables and a model that predicts component values as a function of the random variables (also known as "process variables" and "mismatch variables," in the art). The foundry may further provide a statistical distribution (e.g., a normal distribution, a Poisson distribution, and the like) for each of the random variables, including a mean value and a standard deviation, targeting operational values of circuit component 101 (e.g., a threshold voltage for a transistor, $V_{th}$). Such information is provided by the foundry in the form of a process development kit (PDK), which is a library including text files that may express, e.g., the threshold voltage for an NMOS transistor, $m_1$, $V_{th}(m_1)$ as:

$$V_{th}(m_1)=0.3+0.01 \cdot x_1+0.03 x_2+0.02 \cdot x_3 \tag{1.1}$$

where $x_1$, $x_2$, and $x_3$ are random variables associated with NMOS transistor $m_1$. For statistical PDKs, the random variables ($x_1$, $x_2$, ... $x_N$) are typically modeled as a Normal distribution with fixed mean and standard deviation:

$$x_i \sim N(\mu_i, \sigma_i^2) \tag{1.2}$$

An expression like Eqs. 1.1 and 1.2 is determined after performing a large number of experiments on multiple CMOS transistors fabricated by the foundry. In general, each circuit component 101 may have a number of random variables, $x_j$, associated with it, and each operational value may be associated to the random variables, $x_j$, by an expression similar to Eqs. 1.1 and 1.2. In some embodiments, the number of random variables and the expression for the operational values in Eqs. 1.1 and 1.2 may depend on the type of circuit component being considered (e.g., NMOS transistor, PMOS transistor, resistor, and the like). More generally, the set of random variables $x_1$, $x_2$, and $x_3$ may be designated by a vector, x, such that $x=(x_1, x_2, x_3)$. Hereinafter, reference to a specific collection, j, of the multiple values for all random variables in the PDK will be made as "sample vector $x_j$" (e.g., with a vector notation in bold).

Further, in some embodiments, expressions such as Eqs. 1.1 and 1.2 may be found in the PDK for all operational parameters of components 101, such that a MC simulation can be carried out for the entire IC design 100 using selected values for random variables ($x_1$, $x_2$, ... $x_N$). Accordingly, a circuit specification, y, may be found, which is associated to the selected values: $y=y(x_1, x_2, ... x_N)$.

Each of components 101 may be described by size features that have a direct impact on the component performance and an overall impact on the performance of the IC design. For example, some of these parameters (e.g., in the case of a MOSFET) may include an area 110-1, a channel width 120-1, or a channel length 130-1 (hereinafter, collectively referred to, for any component 101, as "area 110," "width 120," or "length 130"). Accordingly, a user configures IC design 100 by selecting area 110, width 120, length 130, and any other size features for each component 101. The user configures IC design 100 to satisfy desired circuit specifications, which may be defined by the user according to an application intended for IC design 100. To estimate a foundry yield for IC design 100, a user may include random variables $x_j$, constrained by expressions such as Eqs. 1.1 and 1.2 in methods as disclosed herein.

In embodiments as disclosed herein, a determination of mismatch contribution may include a multi-dimensional model, including coefficients as described in the following mathematical expression $$f(x) = \sum_{i=1}^{N} a_i x_i + \sum_{i=1}^{N} b_i x_i^2 + \sum_{i \neq j} c_i x_i x_j + d \tag{2}$$

where ($x_1$, $x_2$, ... $x_N$) are the random variables related to this circuit (cf. Eqs. 1.1 and 1.2).

In Eq. 2, coefficients "ai" are linear coefficients, coefficients "bi" are quadratic coefficients, coefficients "ci" are cross term coefficients, and coefficient "d" is a constant. Some of these coefficients (ai, bi, ci, and d) may be zero depending on the model. In some embodiments, Eq. 2 is found by performing a limited number, M, of MC simulations for multiple selections of the set of random variables $y_s=y(x_1, x_2, ... x_N)_s$, e.g., using foundry provided parametrization for each component 101 (cf. Eqs. 1.1 and 1.2). The number, S, of MC simulations used to determine Eq. 2 is selected to be large enough to provide an accurate model, without imposing a heavy burden on the computational resources and time for completion. Thus, Eq. 2 may be determined using a multi-linear regression approximation, e.g., finding a "surface" in a multidimensional space (N+1 dimensions) approximating data points (y, $x_1$, $x_2$, ... $x_N$)$_s$.

In some embodiments, a determination of mismatch contribution may include a mixed solver model, e.g., when a model based on Eq. 2 is not sufficiently accurate, the mismatch contribution is calculated by a linear model that combines a least square computation with an orthogonal matching pursuit (OMP) strategy to estimate the variance in circuit specifications.

To illustrate the use of Eq. 2 and the mixed solver model in the context of mismatch contribution and feature size adjustment, a circuit specification associated with a threshold voltage ($V_{th}$) for a component (e.g., a transistor), may be considered. A mismatch variation of $V_{th}$, may be the dominant variation source for certain circuit specifications. Accordingly, the following rule for the scaling of $V_{th}$ with component features may be assumed to be $$\Delta V_{th} \sim 1/\sqrt{WL} \tag{3}$$

Other variation sources, like a current factor ($\mu \cdot C_{ox} \cdot W/L$), tend to scale similarly $$\Delta(\mu \cdot C_{ox} \cdot W/L) \sim 1/\sqrt{WL} \tag{4}$$

The validity of Eqs. 3 and 4 may be tested against PDKs provided by several vendors, and it holds within acceptable margin for multiple circuit designs and foundries. Accordingly, when the area of a component is increased by a times, some embodiments assume that a variation related to that component is scaled by a multiplier, as follows $$m = 1/\sqrt{\alpha} \tag{5}$$

In some embodiments, the model for Eq. 2 assumes that the random variables in the PDKs come from a linear combination of "actual," zero-mean variation sources "zi"

$$x_i = \mu_i = \sum_{j=1}^{K} q_{ij} z_{ij} \qquad (6)$$

The actual variation sources ($z_{i1}$, $z_{i2}$, ..., $z_{iK}$) are generally unknown to the PDK user. However, in many instances the random variables ($x_1$, $x_2$, ... $x_N$) are not very different from a linear combination of actual variation sources ($z_{i1}$, $z_{i2}$, ..., $z_{iK}$). Note that the number of random variables, N, may not be the same as the number of actual variation sources, K. Embodiments as disclosed herein include determining Eq. 6 using any one of linear regression techniques. For example, some embodiments, determine Eq. 6 may be obtained using principal component analysis (PCA) of the actual variation sources zi.

FIG. 2 illustrates a display of a list 200 of components 101 in an IC design sorted according to a mismatch contribution of each component for different performance parameters in the IC design (e.g., IC design 100), according to some embodiments. List 200 may be a tabular display called mismatch contribution table. Without loss of generality, the mismatch contribution of each device may be displayed as a percentage. List 200 may include a row for each of the components 101 in the IC design. Each column 220-1 through 220-4 (hereinafter, collectively referred to as "columns 220") is associated with a circuit specification. Accordingly, column 220-1 is associated with a nominal phase margin of the circuit, column 220-2 is associated with a nominal gain for the circuit, column 220-3 is associated with a nominal 3 dB bandwidth for the circuit, and column 220-4 is associated with a nominal current for the circuit. Thus, values 221-1 through 221-10 and 221-c (hereinafter, collectively referred to as "mismatch contributions 221") indicate individual mismatch contributions to the variance of nominal phase margin for the IC design for each of components (e.g., transistors, capacitor) 101-1 through 101-10 and 101-c, and their sum is equal to, or approximately equal to, 100%. Likewise, values 222-1 through 222-10 and 222-c (hereinafter, collectively referred to as "mismatch contributions 222") indicate individual mismatch contributions to the variance of nominal gain for the IC design for each of components 101, and their sum is equal to, or approximately equal to, 100%. Similarly, values 223-1 through 223-10 and 223-c (hereinafter, collectively referred to as "mismatch contributions 223") indicate individual mismatch contributions to the variance of nominal 3 dB bandwidth for the IC design for each of components 101, and their sum is equal to, or approximately equal to, 100%. And values 224-1 through 224-10 and 224-c (hereinafter, collectively referred to as "mismatch contributions 224") indicate individual mismatch contributions to the variance of nominal current for the IC design for each of components 101, and their sum is equal to, or approximately equal to, 100%.

The values in columns 220 indicate the percentage contribution of the variability of each component 101 in the left column to the total variance associated with the circuit specification associated with column 220. Accordingly, the sum of the percentage values down each of columns 220 is equal or close to, 100%. Moreover, in some embodiments, list 200 is sorted down according to the values in column 210. In some embodiments, the user may select one of columns 220 to sort down (or up, depending on the type of values used: e.g., percent, mA, V, power, dB, and the like) the rows in list 200.

To evaluate the total variance associated with a circuit specification, $y_i$, some embodiments may use the M values obtained through the MC simulation. For each specification, $y_i$, and for each sample, $x_j$, from the M samples in the MC simulation, an error $e_{ij}$ is obtained as $$e_{ij} = y_{ij,actual} - y_{ij,predicted} \qquad (7)$$

The error standard deviation, $\sigma_i$, (e.g., the total variance for specification $y_i$), may be obtained from $$\sigma_i = \sqrt{\frac{1}{M-1} \cdot \sum_{j=1}^{M} e_{ij}^2} \qquad (8)$$

Note that Eq. 8 indicates the overall standard deviation for specification $y_i$. The mismatch contribution for a component h associated with random variables $x_{h1}$, ..., $x_{hJ}$ can be calculated based on the model for the circuit specification (cf., Eq. 2). One possible method of calculating the mismatch contribution is through an expectation value (E):

$$v_{ih} = \sum_{l=1}^{J} E\left[\left(\frac{\partial f}{\partial v_{hl}}\right)^2\right] / \sum_{i} \sum_{l=1}^{J} E\left[\left(\frac{\partial f}{\partial v_{il}}\right)^2\right] \qquad (9.1)$$

where $v_{hl}$ is the mismatch contribution for random variable $x_{hl}$. The function, $f$, is the full model (e.g., Eq. 2). The expectation value, E, may be obtained assuming a normal distribution for the random variables, and i is an index that runs over all the components of the IC design.

Assuming a normal distribution for the random variables (cf. Eqs. 1.1 and 1.2), then $$x_i = \mu_i + s_i \cdot v_i$$

where $s_i$ is the standard deviation of random variable $x_i$. Accordingly, Eq. 9 may be expressed in terms of the standard deviations, $s_i$, and the functional expression ($f$), as a function of random variables, $x_i$, as $$v_{ih} = \sum_{l=1}^{J} s_{hl}^2 E\left[\left(\frac{\partial f}{\partial x_{hl}}\right)^2\right] / \sum_{i} \sum_{l=1}^{J} s_{il}^2 E\left[\left(\frac{\partial f}{\partial x_{il}}\right)^2\right] \qquad (9.2)$$

A column 210 may indicate the maximum mismatch contribution, among the circuit specifications in columns 220, associated with a given component 101. For example, for transistor 101-6, the maximum mismatch contribution value is 210-6 (73%) for a nominal current variance 224-6 (hereinafter, collectively referred to as "nominal current variances 224"). Likewise, for transistor 101-10 the maximum mismatch contribution value is 210-8 (38%), which occurs for a nominal phase margin variance 221-8 (hereinafter, collectively referred to as "nominal phase margin variances 221"). Further, for transistor 101-5 the maximum mismatch contribution value is 210-5 (7%), which occurs for a nominal gain variance contribution 222-5 (hereinafter, collectively referred to as "nominal gain variances 222"). Also, for transistor 101-2 the maximum mismatch contribution value is 210-2 (37%), which occurs for a nominal 3 dB bandwidth variance contribution 223-2.

FIG. 3 illustrates a display 300 of the list 200 of components in the IC design, and a list 350 of feature size factors including adjustable scales 360-1 through 360-10 (hereinafter, collectively referred to as adjustable scales 360) for each component in the list of components, according to some embodiments. In some embodiments, list 350 is displayed next to list 200 including the mismatch contribution table. In some embodiments, adjustable scales 360 include a slider and a text field to set a feature size multiplier for each component. The slider is configured to receive an input from a user to select a scaling value (e.g., increased scaling with a slide to the right, and a decreased scaling with a slide to the left). In some embodiments, the slider in adjustable scales is set by default at the middle position, indicating a scaling factor m=1 (e.g., no change in component feature size as per the original IC design).

Assuming a model of the circuit specification as in Eq. 2, in some embodiments it is expected that, after scaling a feature size of the circuit component, the random variables xi for all the circuit components will re-scale to new random variables xi', wherein Eq. 2 still holds according to $$f'(x') = \sum_{i=1}^{N} a'_i x'_i + \sum_{i=1}^{N} b'_i x_i'^2 + \sum_{i \neq j} c'_i x'_i x'_j + d' \quad (10)$$

wherein the model further determines new coefficients "ai'," "bi'," "ci'," and "d'," as follows.

After a feature size scaling $\alpha_i$, the variation sources may be multiplied by a scaling factor $m_j$, which is determined by the following expression (cf. Eq. 5):

$$m_i = 1/\sqrt{\alpha_i} \quad (11)$$

In some embodiments, $x'_i$ follows the same distribution as $x_i$, thus (cf. Eq. 6)

$$x'_i = \mu_i + \frac{1}{m} \sum_{j=1}^{K} q_{ij} z_{ij} \quad (12)$$

Therefore, $$x_i = \mu_i + m_i(x'_i - \mu_i) \quad (13)$$

Using Eq. 12 in Eq. 2, yields $$f(x) = \sum_{i=1}^{N} a_i(\mu_i + m_i(x'_i - \mu_i)) + \sum_{i=1}^{N} b_i(\mu_i + m_i(x'_i - \mu_i))^2 + \sum_{i \neq j} c_i(\mu_i + m_i(x'_i - \mu_i))(\mu_j + m_j(x'_j - \mu_j)) + d \quad (14)$$

Comparing Eq. 14 with Eq. 10 yields the following expressions for the new coefficients ai', bi', ci', and d' in terms of the scaling factors mi and the original coefficients ai, bi, ci, and d:

$$a'_i = a_i m_i + 2b_i m_i(1-m_i)\mu_i + \sum_{j \neq i} c_{ij}(1-m_j)\mu_j m_i \quad (15)$$

$$b'_i = b_i m_i^2$$

$$c'_{ij} = c_{ij} m_i m_j$$

$$d' = d + \sum_{i=1}^{N} a_i(1-m_i)\mu_i +$$

-continued $$\sum_{i=1}^{N} b_i(1-m_i)^2\mu_i^2 + \sum_{j \neq i} c_{ij}(1-m_i)(1-m_j)\mu_j\mu_i$$

Accordingly, with the coefficients (ai, bi, ci, d) from Eq. 2 obtained with a limited number of MC simulations, the coefficients (ai', bi', ci', d') are updated and a mismatch contribution is recalculated according to the scaling factors mi.

In addition to predicting the new mismatch contribution, some embodiments include a prediction of new standard deviations for the circuit specification based on the re-scaling of components 101. Accordingly, the user may desire to adjust the re-scaling factors mi to reduce the total variation of a circuit specification. Thus, embodiments as disclosed herein provide real-time feedback to the user as to whether or not a suggested change in a component may produce a desired outcome.

To find the new standard deviation for the overall circuit specification, some embodiments include the MC samples, s, collected to determine the model described in Eq. 2 by the combined component point $(x^{(s)}, y^{(s)})$, where $x^{(s)} = (x_1, x_2, \ldots x_N)$, and $y^{(S)}$ is the result of the MC simulation using $x^{(s)}$ values.

Without device scaling (mi=1 for all i), $y^{(S)}$ is approximated, but may not be identical to, $f(x^{(s)})$ through Eq. 2. For scaling factors where mi≠1 at least for one i (for one component), the tool obtains a new value of $y^{(k)}$ ($x^{(s)}$) by the following equation:

$$y_{new}^{(s)} = y^{(s)} - \theta(x^{(s)}) + f'(x^{(s)}) \quad (16)$$

Where $f'(x^{(s)})$ is obtained by evaluating Eq. 10 with values $x^{(s)}$.

Accordingly, some embodiments use the values for $y_{new}$ in Eq. 16 to determine a new standard deviation, $\sigma_{new}$, which may be computed as:

$$\sigma_{new}(y) = \sqrt{\frac{1}{M-1} \sum_{s=1}^{M} (y_{new}^{(s)} - \text{mean}(y_{new}))^2} \quad (17)$$

where M is the selected number of MC simulations performed to obtain Eq. 2.

Note that Eq. 17 indicates the overall standard deviation for specification y. The mismatch contribution for a component h associated with random variables $x_{h1}, \ldots, x_{hJ}$ is then determined using an expectation value as in Eqs. 9.1 or 9.2, where the function, $f$, is replaced by the function $f'$ (cf. Eq. 10).

When the multiplier, mi, of any device is modified, list 300 is updated in real time to indicate increase/decrease of the associated mismatch contribution, or the overall circuit specification, according to a standard deviation computed by Eq. 17. In some embodiments, a different color is used to indicate a change in the mismatch contribution or overall standard deviation when this is reduced (e.g., from black to red), or increased (e.g., from black to blue).

In some embodiments, a model f, or f' (cf Eqs. 2 and 10) may not be accurately estimated from the MC simulation data. Accordingly, in some embodiments the variance contribution is estimated using a mixed solver. In some embodiments, a mixed solver may include a partial least squares method or an orthogonal matching pursuit model applied to a linear and a quadratic approximation and calculate the mismatch contributions, $v_i$, from the MC calculations without re-scaling.

In some embodiments, the new contribution, $v_i'$, is estimated with the following approximate method:

$$v_i' = \frac{v_i m_i^2}{\sum_{j=1}^{N} v_j m_j^2} \quad (19)$$

where $v_i$ is the original mismatch contribution calculated by the mixed solver.

Eq. 19 may be understood as the variance expected from a linear model (e.g., Eq. 2 with only the a, and d coefficients). In such embodiments, the variance is expected to be approximately proportional to $m_i^2$. Accordingly, it is reasonable that the mismatch contribution scales as $m_i^2$. In addition, Eq. 19 is normalized over the sum of all contributions 100%.

In display 300, the feature size of three components has been modified, namely, transistors 101-6, 101-7, and 101-8. Accordingly, a user may desire to modify first the components associated with the largest mismatch contribution. More specifically, the area of transistor 101-6 has been increased by a factor m6=2.5×, the area of transistor 101-7 has been reduced by a factor 0.5×, and the area of transistor 101-8 has been increased by a factor 2×. As a result, list 200 is modified with updated values: the mismatch contribution for phase margin 221-6 reduces from 6% to 2% (321-6), mismatch contribution for nominal gain 222-6 reduces from 37% to 21% (322-6), mismatch contribution for bandwidth 223-6 reduces from 3% to 1% (323-6), and mismatch contribution for nominal current 224-6 reduces from 73% to 54% (324-6). On the contrary, a reduction by half of the area of transistor 101-7 increases the mismatch contribution for phase margin 221-7 from 44% to 69% (321-7), increases the mismatch contribution for nominal gain 222-7 from 4% to 8% (322-6), increases the mismatch contribution for bandwidth 223-7 from 9% to 16% (323-7), and increases the mismatch contribution for nominal current 224-7 from 2% to 7% (324-7). And the increase of the size of transistor 101-8 reduces the mismatch contribution for phase margin 221-8 from 38% to 18% (321-8), reduces the mismatch contribution for nominal gain 222-8 from 19% to 13% (322-8), reduces the mismatch contribution for bandwidth 223-8 from 9% to 5% (323-8), and reduces the mismatch contribution for nominal current 224-8 from 9% to 8% (324-8).

Notably, the reduction of the mismatch contribution from the feature size adjustment of transistors 101-6, 101-7, and 101-8 produces a net reduction in overall circuit standard deviation in nominal gain (−15.57%), in bandwidth (−0.19%), and in nominal current (−26.81%). All other mismatch contribution values listed in display 300 (e.g., mismatch contributions 221, 222, and 223) are unchanged relative to display 200.

For illustrative purposes only, and without limitation, an IC design may include specifications such as Gain, Current, UGF, and Phase Margin. According to list 200, transistor 101-6 (M6) may be the most critical component in the IC design (cf. value 210-6 73%). In fact, at least for Gain and Current, transistor 101-6 has the largest mismatch contribution of all components.

An original size for transistor 101-6 may include length 130-6 (L=450 nm), and width 120-6 (W=6.5 μm). A user may desire to adjust the size of transistor 101-6 by applying a size factor of approximately x2 to length, and a size factor of approximately 2× to the width. Accordingly, there is a factor of about 4× applied to the area of the device. The estimated and actual values are shown in Table 1.

TABLE 1

| Spec | Old Contribution | Predicted Contribution | Actual Contribution | Old Std | Predicted Std | Actual Std |
|---|---|---|---|---|---|---|
| Gain | 53 | 22 | 29 | 78.55 m | 61.19 m | 75.04 |
| Current | 95 | 82 | 79 | 23.59 u | 12.91 u | 10.63 u |
| UGF | 95 | 84 | 81 | 11.95M | 6.48M | 6.25M |
| Phase Margin | 72 | 39 | 46 | 195.5 m | 133.49 | 162.3 m |

In Table 1, the predicted mismatch contribution is obtained using Eqs. 2, 10, 17 and 18, and it is seen that a reduction of the mismatch contribution and the overall standard deviation of the three specifications (Gain, Current, and UGF) are substantially reduced. Moreover, it is seen that a comparison with an "actual" mismatch contribution and standard deviations obtained with MC simulation is consistent with the model. Table 1 demonstrates that the model is sufficiently accurate to indicate the change (increase/decrease) of the mismatch contribution and the overall standard deviation for a specification when a selected component is re-sized. Accordingly, a user may simply select the component to modify and an approximate value of the re-sizing of the component before performing a costly and lengthy MC simulation.

As another illustration, when the circuit specification (e.g., IC design 100) is a random offset (e.g., a 'turn on' Voltage), the critical devices are the differential pair including transistors 101-1 ($M_1$) and 101-2 ($M_2$). In some embodiments, a first specification associated with a random offset may be a linear difference: V(inm)−V(inp). In some embodiments, a second specification associated with a random offset may be a non-linear, absolute value difference: |V(inm)−V(inp)|. For illustration purposes only, the size factor for 120-1 (W), 130-1 (L) and 120-2 (W), 130-2 (L) is increased by 2×. The results of applying a method as disclosed herein are shown in TABLE 2. Accordingly, the predicted values for the linear specification are better than in the non-linear case. The method gains accuracy for the linear specification compared to the non-linear specification, and in both cases reasonably predicts the reduction in standard deviation resulting from the re-sizing of transistors 101-1 and 101-2.

TABLE 2

| Spec | M1 Old Cont. | M1 Pred. Cont. | M1 Actual Cont. | M2 Old Cont. | M2 Pred. Cont. | M2 Actual Cont. | Old Std | Pred. Std. | Actual Std. |
|---|---|---|---|---|---|---|---|---|---|
| Offset | 45 | 44 | 45 | 53 | 52 | 53 | 5.869 m | 4.199 m | 4.169 m |
| Abs (Offset) | 44 | 42 | 45 | 53 | 49 | 52 | 3.547 m | 2.101 m | 2.52 m |

Figure 4:
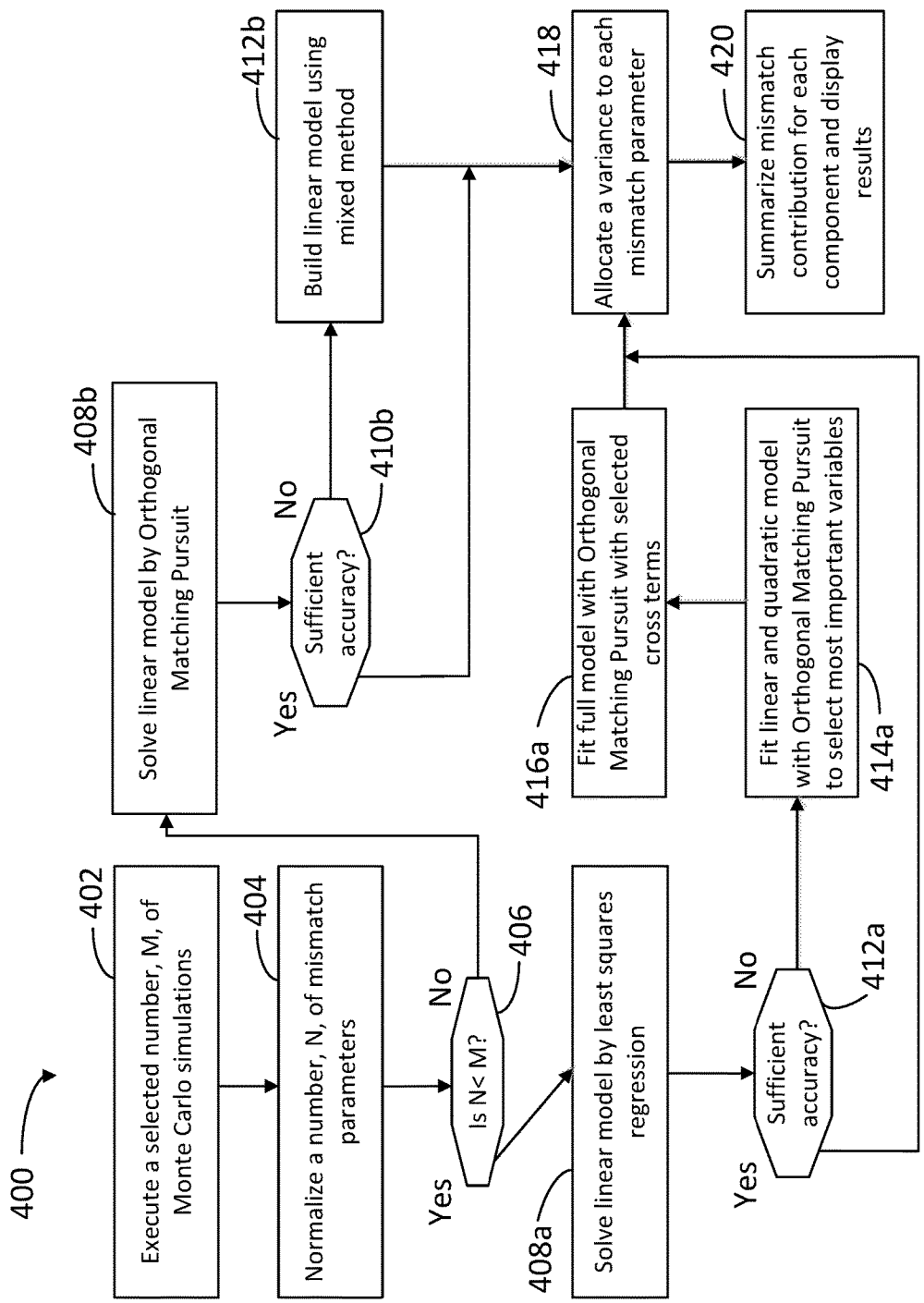
FIG. 4 is a flowchart illustrating steps in a method to predict a mismatch variation for circuit components in an IC design, according to some embodiments.

FIG. 4 is a flowchart illustrating steps in a method 400 to predict a mismatch variation for circuit components in an IC design (e.g., components 101 and IC design 100), according to some embodiments. The mismatch variation may be associated with any one of multiple circuit performance specifications, y (e.g., phase margin, nominal gain, bandwidth, nominal current, leakage current, power consumption, voltage offset, and the like). At least some of the steps in method 400 may be performed by a computer having a processor executing commands stored in a memory of the computer. Further, steps as disclosed in method 400 may include retrieving, editing, and/or storing files in a database that is part of, or is communicably coupled to, the computer. Methods consistent with the present disclosure may include at least some, but not all of the steps illustrated in method 400, performed in a different sequence. Furthermore, methods consistent with the present disclosure may include at least two or more steps as in method 400, performed overlapping in time, or almost simultaneously.

In some embodiments, at least one or more of the steps in method 400 may be performed in a cloud computing environment, wherein a computer may include servers, such as a master server and a slave server. Accordingly, at least some of the steps illustrated in method 400 may be performed in parallel in different processors, following separate computational threads. For example, each of the separate computational threads may be performed by at least one of slave servers in each of multiple applications and processors dedicated to the specific computational thread.

Step 402 includes executing a selected number, M, of MC simulations. In some embodiments, step 402 includes performing a full mismatch contribution analysis for each of the components in the IC design, using the M simulations.

Step 404 includes normalizing a number, N, of mismatch parameters associated with the IC design. In some embodiments, step 404 includes associating a normal statistical distribution to the random variables included in a PDK report from a foundry, for each component in the IC design, to find the total number, N, of mismatch parameters to be used in a model.

Step 406 verifies whether N is smaller than M. When N is smaller than M, step 408a includes solving a linear regression model for the specification (e.g., Eq. 2 including only "ai" and "d" coefficients). In some embodiments step 408a includes performing a least squares regression to the M values for the specification obtained through the MC simulation, assuming the specification is a linear function of the N random variables selected.

Step 412a includes verifying whether the linear model provides sufficient accuracy. When the linear model provides sufficient accuracy, step 418 includes allocating a variance to each mismatch parameter and step 420 includes summarizing a mismatch contribution for each component and displaying the results. In some embodiments, step 420 includes providing a list for a computer display (e.g., list 200), in which the components are listed in a first column and the mismatch contribution values are listed on rows associated to the components, and forming a plurality of columns with each column associated with a specification. In some embodiments, the mismatch contribution values are provided in units corresponding to the variance of the specification, or in percentage units corresponding to the percent proportion of the mismatch contribution of each component relative to the total variance of the specification for the overall IC design. In some embodiments, step 420 may also include a maximal column including the maximum mismatch contribution value (in percent) within the row of specifications, for each component. Further, in some embodiments step 420 may include sorting the columns according to the mismatch contribution values for either one of the specification columns or the maximal column.

When the linear model does not provide sufficient accuracy according to step 412a, step 414a includes fitting a linear and quadratic model (e.g., Eq. 2 including "ai," "bi," and "d" coefficients). In some embodiments, step 414a may include using an orthogonal matching pursuit (OMP) method for fitting the linear and quadratic models. In some embodiments, an OMP may include a sparse regression algorithm that aims to maximize the model accuracy and model sparsity at the same time. Accordingly, OMP may by desirable to enhance circuit performance models because the number of significant contributors used is typically smaller than other models.

Step 416a includes fitting a full model with the OMP method (e.g., Eq. 2 including at least some of the "ci," coefficients). Step 418 for allocating a variance to each mismatch parameter may follow. In some embodiments, after step 416a, step 418 includes allocating the variance for the specification, y, associated with a random variable $x_j$, by determining an expectation value of the model. Once the variance has been allocated in step 418, step 420 includes summarizing the mismatch contribution for each component and displaying the results, as described in detail above.

When step 406 verifies that N is larger than, or equal, to M, step 408b includes performing an OMP method to solve a linear model (e.g., Eq. 2 including only "ai" and "d" coefficients).

Step 410b includes verifying whether the linear model obtained with the OMP method is sufficiently accurate. When the linear model obtained with the OMP method is not sufficiently accurate, step 412b includes building the linear model using a mixed method that combines an OMP method with linear regression. An some embodiments, a mixed method in step 412b includes sorting all variables, from largest to smallest absolute value of its correlation coefficient to the output. Further, the mixed method in step 412b may include determining the contribution by adding variables in the sorted order, until sufficient variance can be explained by a linear model.

When the linear model obtained with the OMP or the mixed method reaches an acceptable accuracy, steps 418 for allocating a variance to each mismatch parameter and 420 for summarizing the mismatch contribution for each component and displaying the results are performed, as described above (e.g., through Eqs. 8-9).

Figure 5:
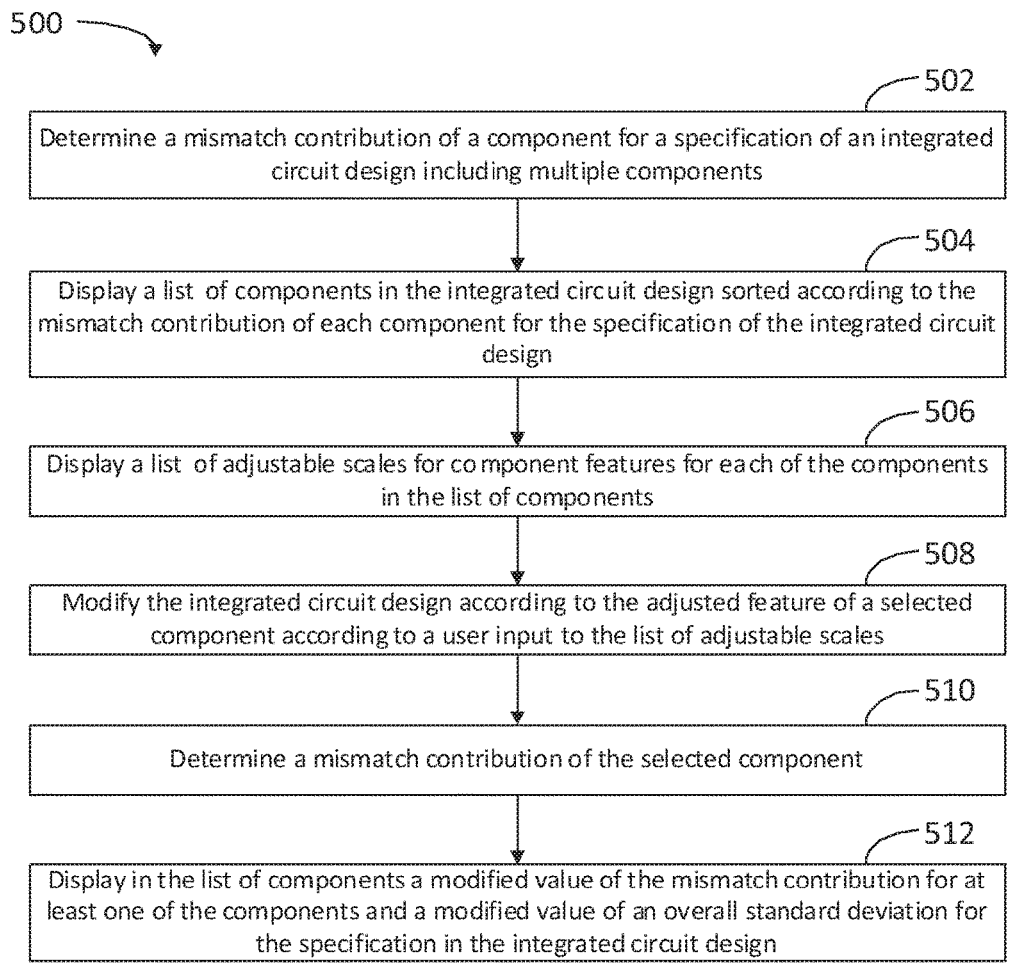
FIG. 5 is a flowchart illustrating steps in an interactive method to predict mismatch variation for circuit components in an IC design, according to some embodiments.

FIG. 5 is a flowchart illustrating steps in an interactive method to predict mismatch variation for circuit components in an IC design (e.g., components 101 and IC design 100), according to some embodiments. The mismatch variation may be associated with any one of multiple circuit performance specifications (e.g., phase margin, nominal gain, bandwidth, nominal current, leakage current, power consumption, voltage offset, and the like). At least some of the steps in method 500 may be performed by a computer having a processor executing commands stored in a memory of the computer. Further, steps as disclosed in method 500 may include retrieving, editing, and/or storing files in a database that is part of, or is communicably coupled to, the computer. Methods consistent with the present disclosure may include at least some, but not all of the steps illustrated in method 500, performed in a different sequence. Furthermore, methods consistent with the present disclosure may include at least two or more steps as in method 500, performed overlapping in time, or almost simultaneously.

In some embodiments, at least one or more of the steps in method 500 may be performed in a cloud computing environment, wherein a computer may include servers, such as a master server and a slave server. Accordingly, at least some of the steps illustrated in method 500 may be performed in parallel in different processors, following separate computational threads. For example, each of the separate computational threads may be performed by at least one of slave servers in each of multiple applications and processors dedicated to the specific computational thread.

Step 502 includes determining a mismatch contribution of a component for a specification of an integrated circuit design that includes multiple components. In some embodiments, step 502 includes performing a selected number of simulations for the integrated circuit design using random variables provided by an integrated circuit foundry. In some embodiments, step 502 also includes selecting a number of random variables provided by an integrated circuit foundry and associated with the component. In some embodiments, step 502 includes forming a model for the specification of the integrated circuit design, the model including at least a linear approximation to a selected number of specification values obtained with a Monte Carlo simulation of the integrated circuit design. In some embodiments, step 502 includes forming a model for the specification of the circuit design, the model comprising a factor modifying a random variable associated with the selected component.

Step 504 includes displaying a list of components in the integrated circuit design, sorted according to the mismatch contribution of each component for different specifications in the integrated circuit design. In some embodiments, step 504 includes displaying a value for an overall standard deviation of the specification of the integrated circuit design. In some embodiments, step 504 includes displaying at least a second mismatch contribution for a second specification of the integrated circuit design, and separately displaying the larger of the first mismatch contribution and the second mismatch contribution. In some embodiments, step 504 includes displaying the modified value in a first format when the modified value is higher than the first mismatch contribution and in a second format different form the first format when the modified value is lower than the first mismatch contribution.

Step 506 includes displaying a list of adjustable scales for component features for each of the components in the list of components. In some embodiments, step 506 includes receiving in at least one adjustable scale a resizing of a feature of one of the components from the list of components.

Step 508 includes modifying the integrated circuit design according to the adjusted feature of a selected component according to a user input to the list of adjustable scales.

Step 510 includes determining a mismatch contribution of the selected component.

Step 512 includes displaying in the list of components a modified value of the mismatch contribution for at least one of the components, and displaying a modified value of an overall standard deviation for the specification in the integrated circuit design.

Figure 6:
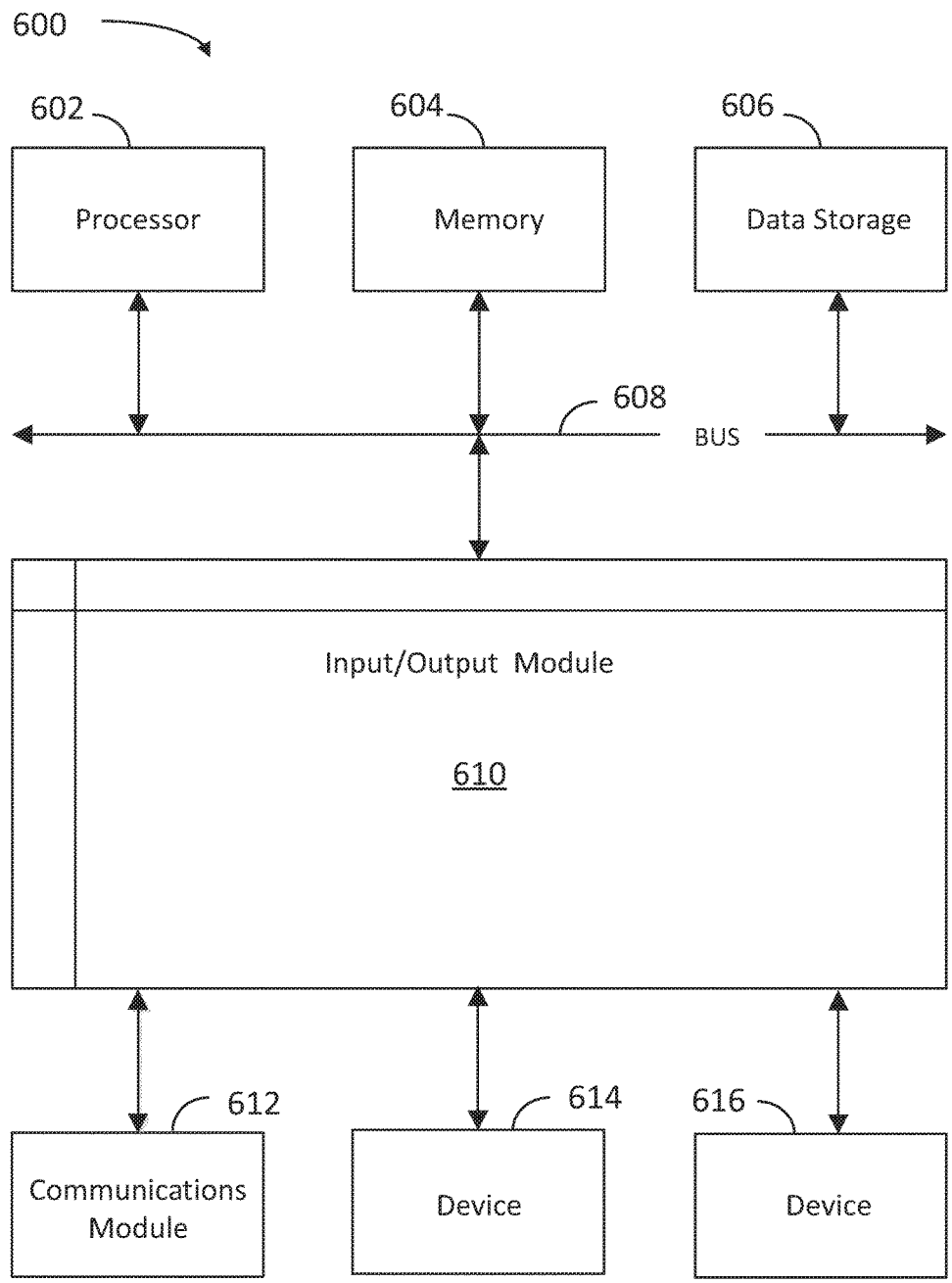
FIG. 6 is a block diagram illustrating an example computer system, according to some embodiments.

FIG. 6 is a block diagram illustrating an example computer system 600 with which the methods and steps illustrated in FIGS. 4 and 5 can be implemented, according to some embodiments. In certain aspects, computer system 600 can be implemented using hardware or a combination of software and hardware, either in a dedicated server, integrated into another entity, or distributed across multiple entities.

Computer system 600 includes a bus 608 or other communication mechanism for communicating information, and a processor 602 coupled with bus 608 for processing information. By way of example, computer system 600 can be implemented with one or more processors 602. Processor 602 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 602 may include modules and circuits configured as a 'placing' tool or engine, or a 'routing' tool or engine, to place devices and route channels in a circuit layout, respectively and as disclosed herein.

Computer system 600 includes, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. Processor 602 and memory 604 can be supplemented by, or incorporated in, special purpose logic circuitry.

The instructions may be stored in memory 604 and implemented in one or more computer program products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis languages, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions.

Computer system 600 is coupled via input/output module 610 to various devices. The input/output module 610 is any input/output module. Example input/output modules 610 include data ports such as USB ports. The input/output module 610 is configured to connect to a communications module 612. Example communications modules 612 include networking interface cards, such as Ethernet cards and modems. In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), or LCD (liquid crystal display) screen, for displaying information to the user.

Methods as disclosed herein may be performed by computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein (e.g., as in methods 400 and 500). One or more processors in a multi-processing arrangement may also be employed to execute the sequences of instructions contained in memory 604. In alternative aspects, hard-wired circuitry may be used in place of, or in combination with, software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 includes servers and personal computer devices. A personal computing device and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 602 for execution. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or "the like" is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience, only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for determining mismatch variation of circuit components in an integrated circuit design, comprising:
    determining, with a processor, a first mismatch contribution of a first component for a first specification of an integrated circuit design, the integrated circuit design and a second mismatch contribution for the first specification of a second component of the integrated circuit design;
    displaying, in a user interface, the first component in a list; above the second component when the first mismatch contribution is greater than the second mismatch contribution;
    displaying, in the user interface, an adjustable scale for a size of the first component and the second component;
    modifying, with the processor, the integrated circuit design by increasing the size of the first component adjusted according to a user input to the adjustable scale or reducing the size of the second component;
    determining, with the processor, an adjusted mismatch contribution of the first component and of the size of the second component;
    displaying, by the user interface, in the list a modified value of the first mismatch contribution, of the second mismatch contribution, and a modified value of an overall standard deviation for the first specification in the integrated circuit design; and
    providing, with the processor, a layout of the integrated circuit design for fabrication when the modified value of the overall standard deviation is below a selected threshold.

2. The computer-implemented method of claim 1, wherein determining the first mismatch contribution comprises performing a selected number of simulations for the integrated circuit design using random variables provided by an integrated circuit foundry.

3. The computer-implemented method of claim 1, wherein determining the first mismatch contribution comprises selecting a number of random variables provided by an integrated circuit foundry and associated with the first component.

4. The computer-implemented method of claim 1, wherein determining the first mismatch contribution comprises forming a model for the first specification of the integrated circuit design, the model comprising at least a linear approximation to a selected number of specification values obtained with a Monte Carlo simulation of the integrated circuit design.

5. The computer-implemented method of claim 1, wherein determining the first mismatch contribution comprises forming a model for the first specification of the integrated circuit design, the model comprising a factor modifying a random variable associated with the first component.

6. The computer-implemented method of claim 1, wherein displaying the first component in the list comprises displaying a value for an overall standard deviation of the first specification of the integrated circuit design.

7. The computer-implemented method of claim 1, further comprising separately displaying a larger one of the first mismatch contribution and the second mismatch contribution.

8. The computer-implemented method of claim 1, wherein displaying the first component in the list comprises displaying the modified value of the first mismatch contribution in a first format when the modified value is higher than the first mismatch contribution and in a second format different from the first format when the modified value is lower than the first mismatch contribution.

9. The computer-implemented method of claim 1, further comprising receiving in a second adjustable scale a resizing of a second component, and determining a second adjusted mismatch contribution for the second component.

10. A system, comprising:
    a memory, storing instructions; and
    at least one processor that executes the instructions to:
        determine a first mismatch contribution of a first component for a first specification of an integrated circuit design and a second mismatch contribution for the first specification of a second component of the integrated circuit design;
        display the first component in a list above the second component when the first mismatch contribution is greater than the second mismatch contribution;
        display an adjustable scale for a size of the first component and the second component;
        modify the integrated circuit design by an increase of the size of the first component adjusted according to a user input or a reduction of the size of the second component;
        determine an adjusted mismatch contribution of the first component and of the second component;
        display in the list a modified value of the first mismatch contribution, of the second mismatch contribution, and a modified value of an overall standard deviation for the first specification in the integrated circuit design; and
        provide a layout of the integrated circuit design for fabrication when the modified value of the overall standard deviation is below a selected threshold.

11. The system of claim 10, wherein to determine the first mismatch contribution the at least one processor executes instructions to perform a selected number of simulations for the integrated circuit design using random variables provided by an integrated circuit foundry.

12. The system of claim 10, wherein to determine the first mismatch contribution the at least one processor executes instructions to select a number of random variables provided by an integrated circuit foundry and associated with the first component.

13. The system of claim 10, wherein to determine the first mismatch contribution the at least one processor executes instructions to form a model for the first specification of the integrated circuit design, the model including at least a linear approximation to a selected number of specification values obtained with a Monte Carlo simulation of the integrated circuit design.

14. The system of claim 10, wherein to determine the first mismatch contribution the at least one processor executes instructions to form a model for the first specification of the integrated circuit design, the model comprising a factor modifying a random variable associated with the first component.

15. The system of claim 10, wherein to display the first component in the list the at least one processor executes instructions to display a value for an overall standard deviation of the first specification of the integrated circuit design.

16. The system of claim 10, wherein to display the first component in the list the at least one processor executes instructions to separately display a larger one of the first mismatch contribution and the second mismatch contribution.

17. The system of claim 10, wherein to display the first component in the list the at least one processor executes instructions to display the modified value in a first format when the modified value is higher than the first mismatch contribution and in a second format different form the first format when the modified value is lower than the first mismatch contribution.

18. A non-transitory, machine-readable medium comprising instructions stored in a memory which, when executed by a processor cause a computer to perform steps in a method, the method comprising:
    determining a first mismatch contribution of a first component for a first specification of an integrated circuit design and a second component of the integrated circuit design;
    displaying the first component in a list above the second component when the first mismatch contribution is greater than a second mismatch contribution;
    displaying an adjustable scale for a size of the first component and the second component;
    modifying the integrated circuit design by increasing the size of the first component adjusted according to a user input to the adjustable scale or reducing the size of the second component;
    determining an adjusted mismatch contribution of the first component and of the second component; and
    displaying in the list a modified value of the first mismatch contribution, of the second mismatch contribution, and a modified value of an overall standard deviation for the first specification in the integrated circuit design; and
    providing a layout of the integrated circuit design for fabrication when the modified value of the overall standard deviation is below a selected threshold.

19. The non-transitory, machine-readable medium of claim 18 wherein, in the method, determining the first mismatch contribution comprises performing a selected number of simulations for the integrated circuit design using random variables provided by an integrated circuit foundry.

20. The non-transitory, machine-readable medium of claim 18 wherein, in the method, determining the first mismatch contribution comprises selecting a number of random variables provided by an integrated circuit foundry and associated with the first component.

* * * * *